United States Patent

Schedule

[11] Patent Number: 5,519,913
[45] Date of Patent: May 28, 1996

[54] WINDSHIELD WIPER BLADE ASSEMBLY WITH ELASTIC CUSHION JOINT FOR ALLOWING SPRING-RESISTANCE ROTATION OF WIPER BLADE RELATIVE TO WINDSHIELD SURFACE

[76] Inventor: Frank Schedule, 424 E. High St., Wills Point, Tex. 75169

[21] Appl. No.: 427,828

[22] Filed: Apr. 26, 1995

[51] Int. Cl.$^6$ .................................................. B60S 1/04
[52] U.S. Cl. ........................... 15/250.46; 15/250.44; 15/250.33; 403/76; 403/113
[58] Field of Search ........................ 15/250.31, 250.32, 15/250.33, 250.42, 250.41, 250.46, 250.44, 250.47; 403/53, 114, 79, 76, 157, 112, 113, 117, 119

[56] References Cited

U.S. PATENT DOCUMENTS

| | | | |
|---|---|---|---|
| 1,112,793 | 10/1914 | Heineman | 15/250.33 |
| 1,678,688 | 7/1928 | Zaiger | 15/250.33 |
| 1,786,457 | 12/1930 | Sarver | 15/250.33 |
| 2,025,888 | 12/1935 | Olivero | 15/250.33 |
| 2,056,777 | 10/1936 | Evans | 15/250.33 |
| 2,513,510 | 7/1950 | Nesson | 15/250.33 |
| 2,618,805 | 11/1952 | Rappl et al. | 15/250.33 |
| 2,618,806 | 11/1952 | MacPherson | 15/250.33 |
| 2,798,242 | 7/1957 | Zeininger et al. | 15/250.33 |
| 2,915,769 | 12/1959 | Ryck | 15/250.33 |
| 2,942,288 | 6/1960 | Zaiger | 15/250.33 |
| 3,006,014 | 10/1961 | Krohm | 15/250.33 |
| 3,751,754 | 8/1973 | Quinian et al. | 15/250.42 |
| 3,877,106 | 4/1975 | Bauer et al. | 15/250.42 |
| 4,287,634 | 9/1981 | Speth | 15/250.42 |
| 4,793,020 | 12/1988 | Stratton et al. | 15/250.46 |
| 5,033,157 | 7/1991 | von Meltzing et al. | 15/250.21 |
| 5,136,749 | 8/1992 | Lukaszewski | 15/250.42 |
| 5,325,563 | 7/1994 | Cayan | 15/250.33 |

FOREIGN PATENT DOCUMENTS

| | | | |
|---|---|---|---|
| 1505554 | 7/1970 | Germany | 15/250.46 |

*Primary Examiner*—Gary K. Graham
*Attorney, Agent, or Firm*—John R. Flanagan

[57] ABSTRACT

An improved windshield wiper blade assembly is disclosed. The improvement is comprised of the ability of the device to allow a controlled and virtually noise free rotation of the blade with respect to the long axis of the blade. The center of such rotation is not critical but it has been found to be most effective to allow the structure to pivot at the joint of the primary yoke and the secondary yoke of the wiper assembly. In doing so, the wiper blade is allowed to be pulled across the windshield surface and not pushed into the windshield thus increasing the wear life and wiping efficiency of the blade. A spring device is disclosed that causes this device to be center seeking to an angle of perpendicular to the surface of the windshield, thereby allowing rotation in a controlled manner. This provides movement in both directions of the reciprocating blade without excessive clearance holes that can cause a noisy operation, the result being a device that is more useful and less distractive to the operator of the vehicle utilizing the invention.

8 Claims, 3 Drawing Sheets

WINDSHIELD WIPER BLADE ASSEMBLY WITH ELASTIC CUSHION JOINT FOR ALLOWING SPRING-RESISTANCE ROTATION OF WIPER BLADE RELATIVE TO WINDSHIELD SURFACE

BACKGROUND OF THE INVENTION

1. Field of the Invention

The invention disclosed herein relates to an improved windshield wiper assembly and specifically to a wiper assembly which permits the rotation of the blade in accordance with the direction of movement of the assembly with respect to the windshield, thus increasing the life of the blade and the effectiveness of same.

2. Overview of Prior Art

Since the invention of the automobile windshield, the difficulty of keeping it clean has challenged inventors and engineers. The windshield is of little use if the driver cannot see through it. Even minimal obstructions such as streaks and smears from inadequate wiper blades can result in detrimental and even potentially fatal consequences. The problem with most wiper blades is that they are not used for a long period of time and then when they are needed, they are necessary immediately. For this reason the process of improving the effectiveness and life of the blade is of valued importance. Many attempts have been made to try to accomplish this but have met with only limited success. Many times other problems have been created in the process.

Allowing the blade to rotate axially along the long axis of the blade allows the cleaning edge of the blade to be pulled across the surface instead of pushed. Methods to accomplish this have been disclosed by Cayan in U.S. Pat. No. 5,325,563 and von Meltzing et. al. in U.S. Pat. No. 5,033,157 in which complicated mechanisms and complex part assemblies are used.

These are not only unusually expensive to produce and therefore potentially price themselves out of the market, but the added assembly and small components create a potential for premature deterioration of the structure.

Speth and Quinian et. al. in U.S. Pat. Nos. 4,287,634 and 3,751,754 respectively disclosed similar methods of allowing the blade to rotate along the long axis of the blade. Both provide a pin which extends through an oversized slot. The pin allows axial movement until the pin contacts the edge of the slot, thus halting the movement. The necessity of excessive clearance between moving parts of a device open to the environment is a potential for disaster as liar as debris clogging up the mating components and preventing movement. When this happens the device ceases to function in the desired manner. In addition, the constant "clinking" of the pin against the slot edge every time the wiper blade changes direction is enough to cause the driver and any passengers sitting nearby great irritation. No spring mechanism is used to cause the device to seek a center position perpendicular to the windshield position. This could accomplish the same thing without the sloppy clinking of metal pans.

In U.S. Pat. No. 3,006,014, Krohm disclosed a rotating device that is set on an angle to the wiper arm and does allow for rotation along the long axis of the blade. The purpose is to allow the blade to remain perpendicular to the curved windshield. Though a potentially superior bearing surface is provided as compared to the previously mentioned two patents, the device also does not provide a spring mechanism and therefore the device will operate in a loose and sloppy manner, irritating to the operator of the vehicle on which the device is being used.

A more complicated version of the devices previously mentioned is disclosed by Zaiger in U.S. Pat. No. 2,942,288. In this a separate link is received by the primary yoke that allows for rotation therewith. The manner of rotation is again a pin which extends through an oversized hole or slot. The same problems are provided by this design as with those previously discussed in addition to an additional arm that must be manufactured and assembled. The clinking with the operation of the device is consistent with those previously discussed.

This issue of noise due to the adjoining arm and yoke was addressed by Stratton et al. in U.S. Pat. No. 4,793,020 by providing a cushion therein. The cushion disclosed in the form of a tape is intended as an insulation only. No articulation method such as a pivot pin or similar devices are used that would provide a method of allowing the blade to rotate along the long axis of the blade.

Numerous other devices have been disclosed that address the issue of complying to the curved surface of the windshield, such as that by Lukaszewski in U.S. Pat. No. 5,136,749. In this patent, a primary yoke and a secondary yoke are used thereby providing an increased number of points of force application to the blade toward the windshield. The limitation of these devices is that they do not address the associated wear problems and lack of adequate cleaning when the blade is pushed across the surface of the windshield and not pulled, which can be solved by allowing the blade to rotate. To provide proper function of the blade assembly the combination of increased articulation and rotation must be employed.

SUMMARY OF THE INVENTION

The object of the disclosed invention is to provide optimal cleaning efficiency and prolonged life of a windshield wiper blade as it is used on a vehicle. The structure is comprised of primary and secondary yokes, the primary of which is attached to an actuated arm. The multiple yokes provide greater dexterity to the flexible blade.

Between the primary and secondary yokes, at their respective pivot points, there is provided an elastic cushion which allows rotation along the long axis of the secondary yoke with respect to the primary yoke. This action allows the blade to rotate and therefore be pulled across the surface of the windshield, creating a smooth cleaning motion. The cushion provides the ability to rotate in a stable, quiet manner without the sloppy clinking noise which would exist without the cushion.

The device is disclosed with a duel yoke mechanism but the invention is not limited thereto. The cushion could exist in a similar manner at the arm and primary yoke joint, with or without the existence of the secondary yokes. The primary yoke could be attached directly to the blade. This version is not disclosed in more detail because it is felt that the preferred embodiment incorporates the multiple yoke method. It is also considered optimal to use the rotateable cushioned joints at the primary to secondary yoke pivots instead of the arm to primary yoke joint. This provides increased stability of the wiper blade to the arm.

DETAILED DESCRIPTION OF THE PREFERRED EMBODIMENT

Figure 1:
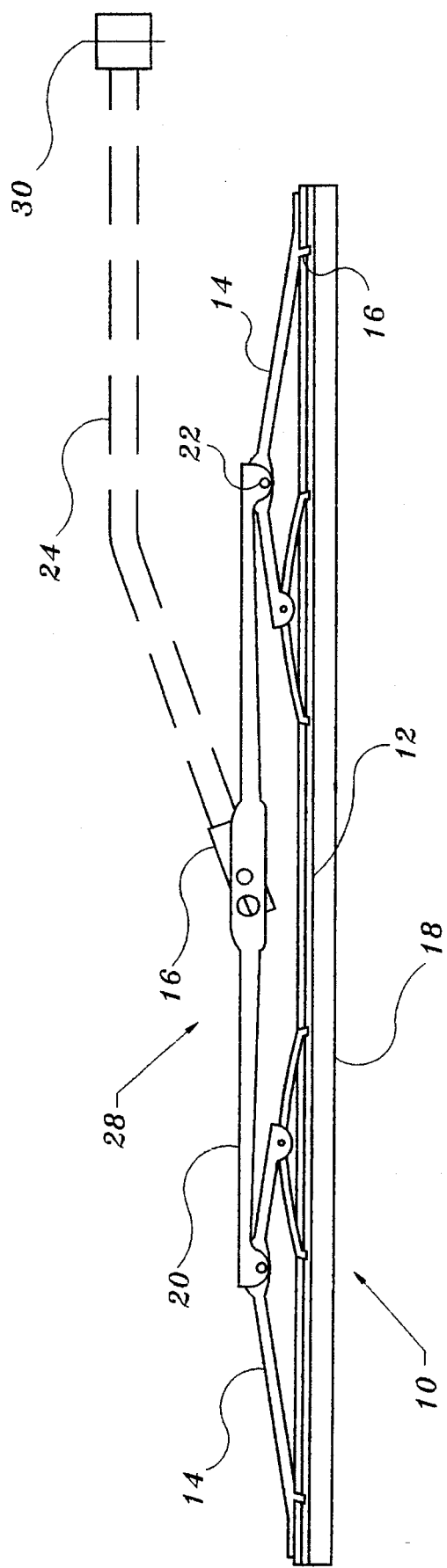
FIG. 1 is a side view of a windshield wiper blade assembly produced in accordance with the preferred embodiment of the present invention.

Referring to the drawings, a windshield wiper blade assembly, constructed in accordance with the present invention is shown in FIG. 1, and comprises a wiper blade 10 which includes a support structure 12 to which the secondary yoke 14 is attached via the attachment clips 16. A pair of secondary yokes 14 located distally on the blade 10 provide the means for support of the blade 10 in an upright position, perpendicular to a bottom edge 18 of the blade 10. The secondary yoke 14 is pivotally mounted to a primary yoke 20 at the distal ends thereof with a pivot rod 22. The pivot rod 22 is designed such that it allows axial rotation about the axis of the rod 22 but also limited rotational movement perpendicular to the long axis of said rod 22. Rotation about the long axis of the rod 22 provides a downward three on the blade 10 so as to provide a force necessary to conform the flexible blade 10 to the surface of the windshield, whether it be flat or curved. The rotation perpendicular to the long axis of the rod 22 allows the secondary yoke 14, and therefore the blade 10 to be dragged across the surface as would result from the action of a drive arm 24 which pivotally fastens to the primary yoke 20 via the retaining clip 26. The drive arm 24 moves the assembly 28 in a reciprocating manner about an axis 30 to remove debris from the surface contacted by the bottom edge 18 of the blade 10.

Figure 2:
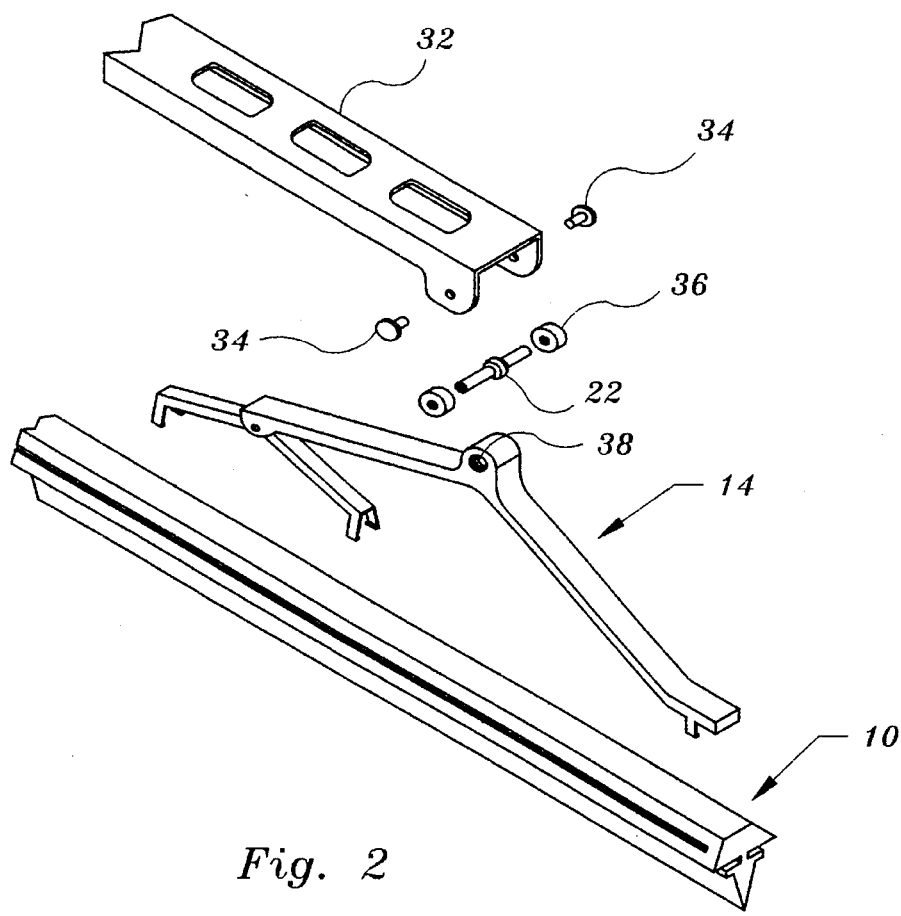
FIG. 2 is an isometric, exploded view of the distal end of a windshield wiper blade assembly produced in accordance with the preferred embodiment of the present invention.

The invention can further be seen in the exploded view of FIG. 2, in which the distal portion of the primary yoke 32 is shown with the pivot rod 22, secondary yoke 14 and the blade 10. Retaining caps 34 are used to secure the rod 22 to the primary yoke 32 with a pair of elastic side supports 36 included and located on either side of the secondary yoke 14 fastened through a hole 38 located therein. The pivot rod 22 has a center portion and a pair of opposite end portions extending in opposite directions from the center portion of the pivot rod 22. The pivot rod 22 is shown here to be provided with a spherical portion located at a center portion thereof, thus providing a controlled rotation perpendicular to the long axis of the pivot rod 22. The center portion of the pivot rod 22 extends through the hole 38 in the secondary yoke 14. The elastic side supports 36 are inserted over the opposite end portions of the pivot rod 22 and disposed at opposite sides of the secondary yoke 14 so as to thereby restrict the rotation of the secondary yoke 14 in the afore stated direction which is further illustrated in FIG. 3.

Figure 3:
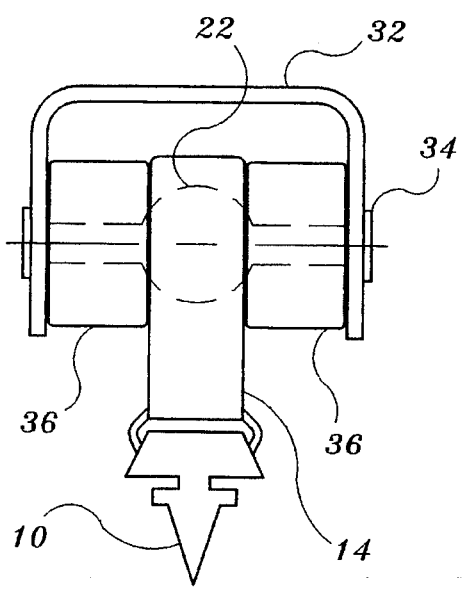
FIG. 3 is an end view of the distal end of a windshield wiper blade assembly produced in accordance with the preferred embodiment of the present invention, shown in a neutral position.

With reference to FIG. 3, an end view of the distal portion of the invention showing the primary yoke 32 with the pivot rod 22 connected by the retaining caps 34 and the elastic side supports 36 surrounding the secondary yoke 14 supporting the blade 10 is displayed. In this view the device is shown in a neutral position without a side load on the blade causing planar movement thereto. The proximity of the elastic side supports 36 with respect to the secondary yoke 14 and the side walls of the primary yoke 32 accurately depict the unloaded tendency of the blade 10 and yoke 14 to extend from the primary yoke 32 perpendicular to the long axis of the pivot rod 22.

Figure 4:
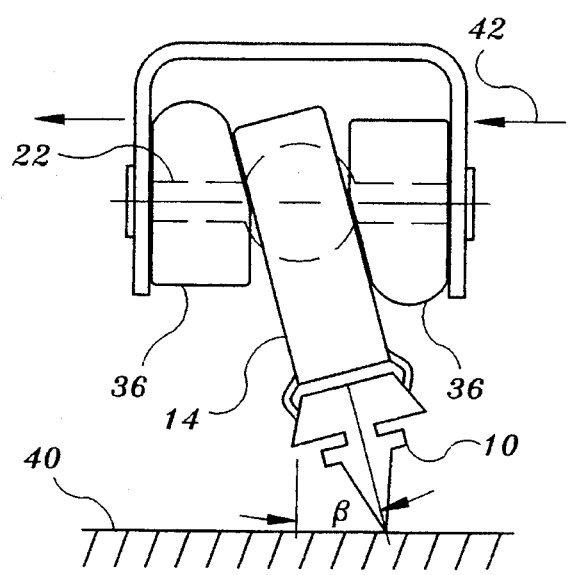
FIG. 4 is an end view of the distal end of a windshield wiper blade assembly produced in accordance with the preferred embodiment of the present invention, shown in a rotated position depicting the range of rotation.

In FIG. 4 the view is similar to that shown in FIG. 3 only the secondary yoke 14 and blade 10 are shown at some angle (beta) with respect to perpendicular to the surface 40 to the cleaned by the blade 10. This would result as a consequence of the right to left motion of the assembly (as indicated by the arrow 42) with respect to the surface 40. The secondary yoke 14 rotates about the articulating surface of the pivot rod 22 and applying a force to the elastic side supports 36, deforming same. This elastic spring tension allows a controlled rotation of the secondary yoke 14 without excess noise and sloppy clearances in the mating parts. The device would act as a mirror image of what is depicted here when the direction of movement changed from left to right, the secondary yoke 14 trailing to the left.

Figure 5:
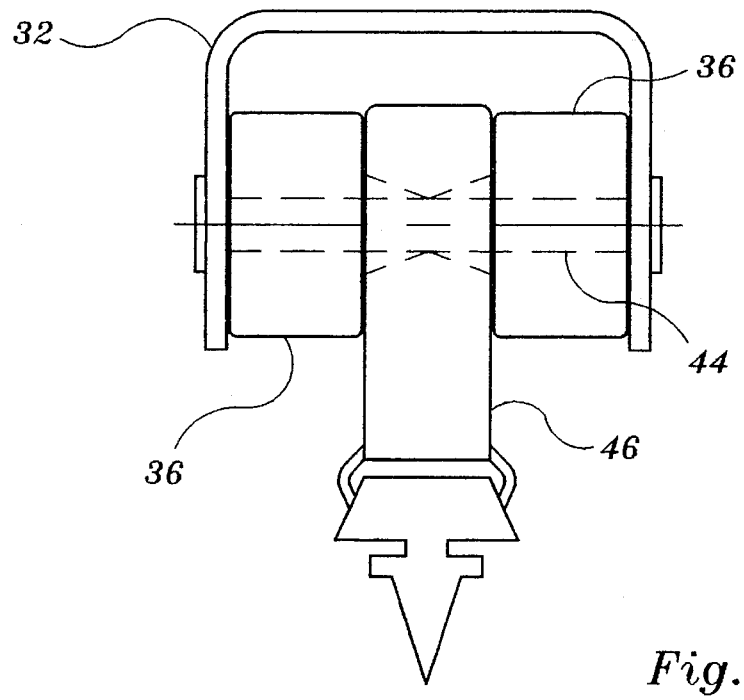
FIG. 5 is an end view of the distal end of a windshield wiper blade assembly produced in accordance with an alternative to the preferred embodiment of the present invention, shown in a neutral position.

An alternative to the preferred embodiment is depicted in FIG. 5, in that the view is again similar to that of FIG. 3 the alteration being that of the smooth pivot rod 44 and the chamfered secondary yoke 46. The function of these items in the invention are the same as earlier described in that the elastic side supports 36 are captured between the sides of the primary yoke 32 and the secondary yoke 46. Here the spherical portion of the pivot rod has been removed and with it a portion of the hole in the secondary yoke has been made out of round so as to permit the same controlled planar rotation as previously described.

Figure 6:
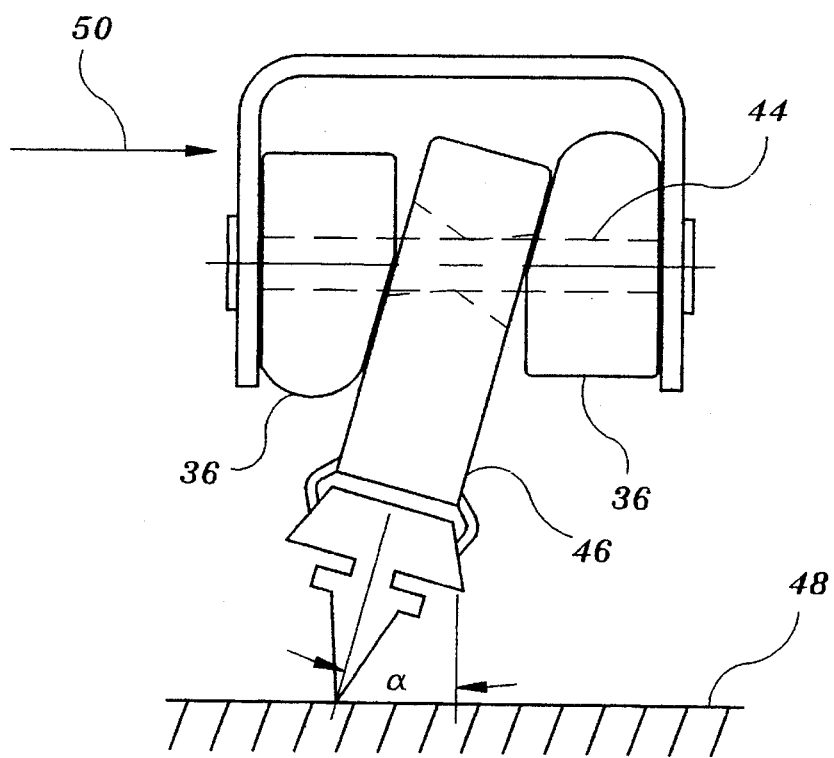
FIG. 6 is an end view of the distal end of a windshield wiper blade assembly produced in accordance with an alternative to the preferred embodiment of the present invention, shown in a rotated position depicting the range of rotation.

FIG. 6 illustrates the movement of the secondary yoke 46 of the invention about the smooth pivot rod 44 as it deforms the elastic side supports 36 as the device moves across the surface 48 in a left to right motion as depicted by the arrow 50. The process is similar to that earlier described, the alteration being that of potential reduced manufacturing costs and thereby potentially expanding the market for this invention.

The rotation as discussed is achieved at the joint of the primary and secondary yokes of the invention. A similar result could be achieved by utilizing a single pivot at be joint of the drive arm and the primary yoke. It has been determined that the optimal area for this rotation in this type of double yoke design is at the area disclosed. The inventor recognizes the potential for alterations in blade structure designs and includes such obvious alternative designs to be adaptable to the disclosed invention.

What is claimed is:

1. In a windshield wiper blade assembly including an elongated wiper blade supported by a substantially rigid elongated support structure, at least one secondary yoke attached to said support structure, and a primary yoke connectable to an arm capable of driving the windshield wiper blade assembly across a windshield, the improvement comprising:

(a) a pivot rod providing a pivotal connection of said primary yoke to said secondary yoke, said pivot rod further comprising a center portion received by said secondary yoke and a pair of opposite end portions extending in opposite directions away from opposite sides of said secondary yoke and away from said center portion, said end portions being received by said primary yoke, said center portion being spherical in shape and received by said secondary yoke at said pivotal connection of said primary yoke to said secondary yoke, said pivotal connection allowing axial and planar rotation of said secondary yoke with respect to said pivot rod and primary yoke about first and second perpendicular axes; and (b) an elastic side support means received on at least one of said opposite end portions of said pivot rod adjacent to at least one of said opposite sides of said secondary yoke, whereby said elastic side support means provides a spring resistance against said planar rotation of said secondary yoke with respect to said pivot rod and primary yoke.

2. The windshield wiper blade assembly as described in claim 1, wherein said primary yoke is comprised of a "U" shaped channel.

3. The windshield wiper blade assembly as described in claim 1, wherein said elastic side support means is comprised of at least one pair of units made from an elastic material of a cylindrical shape with a smaller cylindrical portion removed from the center thereof.

4. The windshield wiper blade assembly as described in claim 3, wherein said elastic material is comprised of a synthetic rubber.

5. In a windshield wiper blade assembly including an elongated wiper blade supported by a substantially rigid elongated support structure, at least one secondary yoke attached to said support structure, and a primary yoke connectable to an arm capable of driving the windshield wiper blade assembly across a windshield, the improvement comprising:

(a) a pivot rod providing a pivotal connection of said primary yoke to said secondary yoke, said pivot rod further comprising a center portion received by said secondary yoke and a pair of opposite end portions extending in opposite directions away from opposite sides of said secondary yoke and away from said center portion, said end portions being received by said primary yoke, said secondary yoke having a hole therethrough which tapers inwardly from said opposite sides, said hole receiving said center portion of said pivot rod, said pivotal connection allowing axial and planar rotation of said secondary yoke with respect to said pivot rod and primary yoke about first and second perpendicular axes; and (b) an elastic side support means received on said opposite end portions of said pivot rod adjacent to said opposite sides of said secondary yoke, whereby said elastic side support means provides a spring resistance against said planar rotation of said secondary yoke with respect to said pivot rod and primary yoke.

6. The windshield wiper blade assembly as described in claim 5, wherein said primary yoke is comprised of a "U" shaped channel.

7. The windshield wiper blade assembly as described in claim 5, wherein said elastic side support means is comprised of at least one pair of units made from an elastic material of a cylindrical shape with a smaller cylindrical portion removed from the center thereof.

8. The windshield wiper blade assembly as described in claim 7, wherein said elastic material is comprised of a synthetic rubber.

* * * * *